United States Patent [19]

Parker

[11] 4,026,273
[45] May 31, 1977

[54] SOLAR FLUID HEATER WITH ELECTROMAGNETIC RADIATION TRAP

[75] Inventor: Blaine Frank Parker, Lexington, Ky.

[73] Assignee: University of Kentucky Research Foundation, Lexington, Ky.

[22] Filed: Mar. 8, 1976

[21] Appl. No.: 664,627

[52] U.S. Cl. .............................. 126/271; 350/288; 350/299

[51] Int. Cl.² ........................................... F24J 3/02

[58] Field of Search ........... 126/270, 271; 237/1 A; 350/288, 299, 293, 294

[56] References Cited

UNITED STATES PATENTS

| | | | |
|---|---|---|---|
| 1,575,309 | 3/1926 | Anderson | 126/271 |
| 3,089,670 | 5/1963 | Johnson | 126/270 |
| 3,869,199 | 3/1975 | Cummings | 126/270 |
| 3,923,039 | 12/1975 | Falbel | 126/271 |
| 3,964,464 | 6/1976 | Hockman | 126/271 |

*Primary Examiner*—Kenneth W. Sprague
*Assistant Examiner*—James C. Yeung

[57] ABSTRACT

A solar fluid heater including a radiation trap for concentrating solar radiation which has been focused on or near a line at the center of a transparent pipe assembly containing the fluid to be heated is described. The pipe assembly may include one or more transparent pipes containing one or more sets of reflective fins which are disposed in direct heat exchanging contact with the fluid to be heated. The focused radiation entering the pipe assembly experiences multiple reflections off one set of reflective fins therein, thus concentrating the solar radiation. The reflective fins are made absorptive near the apex to provide for absorption of the solar radiation, thereby converting it to heat. The fins are in direct contact with the fluid to be heated, thus, maximizing the transfer of heat to the fluid.

15 Claims, 6 Drawing Figures

4,026,273

SOLAR FLUID HEATER WITH ELECTROMAGNETIC RADIATION TRAP

BACKGROUND OF INVENTION

1. Field of Invention

The present invention relates to a solar fluid heater, which performs the functions of absorbing solar energy, converting it to heat and transferring this heat to a working fluid with a minimum of heat loss. More specifically, the present invention relates to a solar fluid heater which maximizes the utilization of solar radiation focused on or near the center line of a transparent pipe containing a fluid to be heated.

2. Description of Prior Art

Heretofore numerous efforts have been made to utilize solar energy for heating fluids. However, these prior art devices in their overall design have not achieved the heat transfer efficiency required to make them practical or effective for commercial utilization.

One type of prior art solar fluid heater device is disclosed in U.S. Pat. No. 1,575,309 to Anderson. In this device the efficiency of heat transfer is somewhat enhanced by use of heat transfer baffles disposed within a fluid conveying pipe and extending longitudinally thereof. However, the Anderson water heater suffers from the disadvantage that a large portion of incident solar energy is lost within the pipe assembly because no attempt is made to internally focus solar radiation on the heat transfer baffles. Therefore, the radiation entering the pipe assembly must be very accurately focused onto said assembly to maximize the efficiency of the device.

Another type of solar fluid heater is disclosed in U.S. Pat. No. 1,661,473 to Goddard et al. The Goddard device makes use of multiple reflections of solar radiation within the heater assembly to concentrate the radiation. However, there is still a considerable amount of energy lost in the Goddard device since all of the radiation incident on the reflectors is not directly transferable to the fluid being heated.

Still another type of prior art solar fluid heater is disclosed in U.S. Pat. No. 2,969,788. Newton utilizes a plurality of reflectors to concentrate incident solar radiation on fluid conduits. However, as in the Goddard device, a substantial amount of incident solar energy, which is absorbed by the reflectors, is never transferred to the fluid to be heated.

SUMMARY OF THE INVENTION

Accordingly, it is a primary object of the present invention to provide an improved solar fluid heater wherein substantially all of the solar radiation penetrating a transparent pipe assembly is converted to heat and directly transferred to the fluid to be heated.

It is another object of the present invention to provide an improved means of concentrating solar radiation in such a manner that it can be converted to heat and conserved for useful purposes.

It is a further object of the present invention to provide an efficient means of collecting solar energy at working fluid temperatures which are substantially higher than can be achieved with flat plate collectors.

It is still another object of the present invention to provide a system for capturing solar radiation which has been theoretically focused on a focal line, but misses the theoretical focus by several degrees.

It is yet another object of the present invention to provide a solar fluid heater which can be utilized for space heating and cooling of buildings, industrial process heating, operation of mechanical devices such as the freon engine, drying of agricultural and industrial products, domestic water heating, generation of electric power, etc.

The objects of the present invention are fulfilled in each of the preferred embodiments by providing a fluid heater consisting of a transparent pipe assembly containing reflective fins which trap and concentrate incident solar radiation which has been focused on or near a line. These reflective fins function both as solar radiation traps and as heat transfer surfaces. In each of the preferred embodiments the fluid to be heated is circulated into direct contact with the reflective fins to provide for direct transfer of heat by conduction and convection from the fins to the fluid.

The fluid heater of the present invention may be utilized with any solar radiation focusing system which has a theoretically focus on a line such as achieved with a cylindrical parabola, longitudinal fresnel lens, strip mirror reflectors, etc. The center line of this fluid heater is to be located substantially on the theoretical focal line of the focusing system. However, the radiation trap of the present invention will capture solar radiation which has missed the theoretical focal line by several degrees. Therefore, much of the radiation which would miss a small target such as a 2 inch diameter pipe will be captured and converted to heat by the radiation trap of the solar fluid heater of the present invention.

BRIEF DESCRIPTION OF DRAWINGS

The objects of the present invention and the attendant advantages thereof may be better understood by reference to the following drawings wherein like numerals refer to like parts and wherein.

DETAILED DESCRIPTION OF PREFERRED EMBODIMENTS

Figure 1:
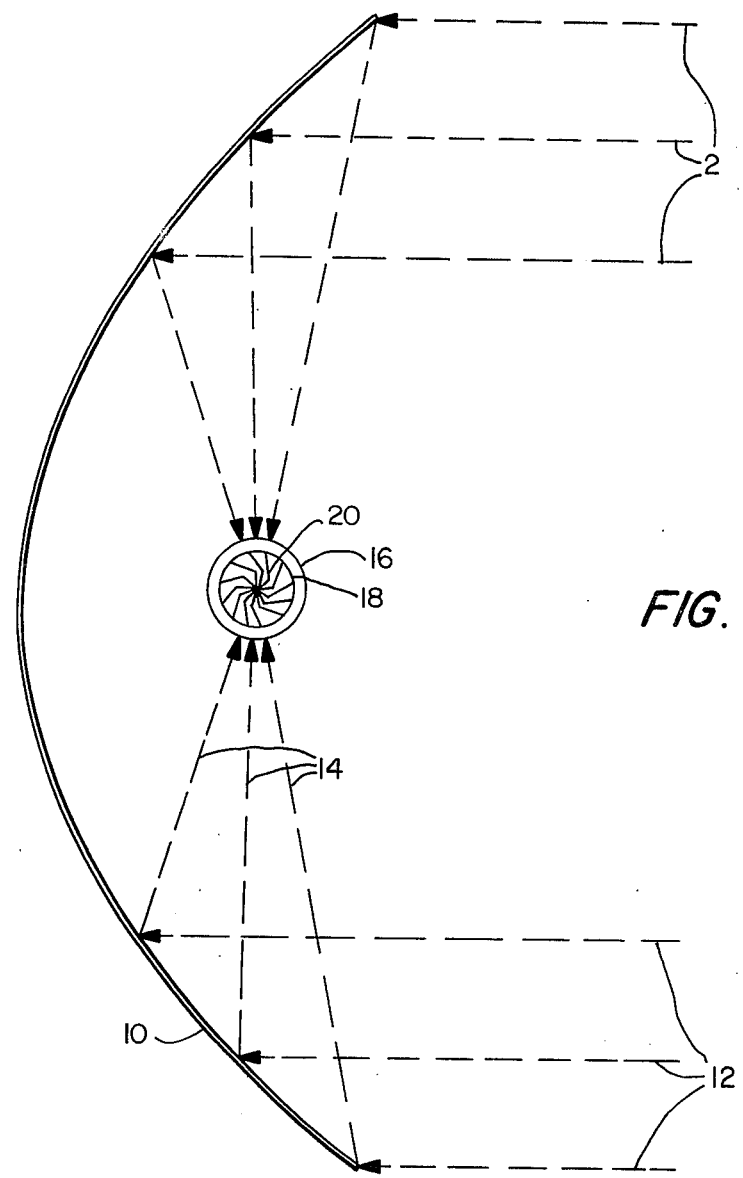
FIG. 1 is a schematic illustration of one means for focusing solar radiation on a line onto the solar fluid heater assembly of the present invention.

Referring in detail to FIG. 1 of the drawings there is illustrated a cylindrical parabolic reflector 10 which reflects solar rays 12 and focuses the reflected rays 14 onto the longitudinal center line of two transparent pipes 16 and 18. Inner pipe 18 is concentrically disposed within outer pipe 16 and contains a plurality of angular reflective fins 20. Fins 20 may extend along the entire longitudinal length of pipe 18 or to a lesser degree if desired.

Figure 3:
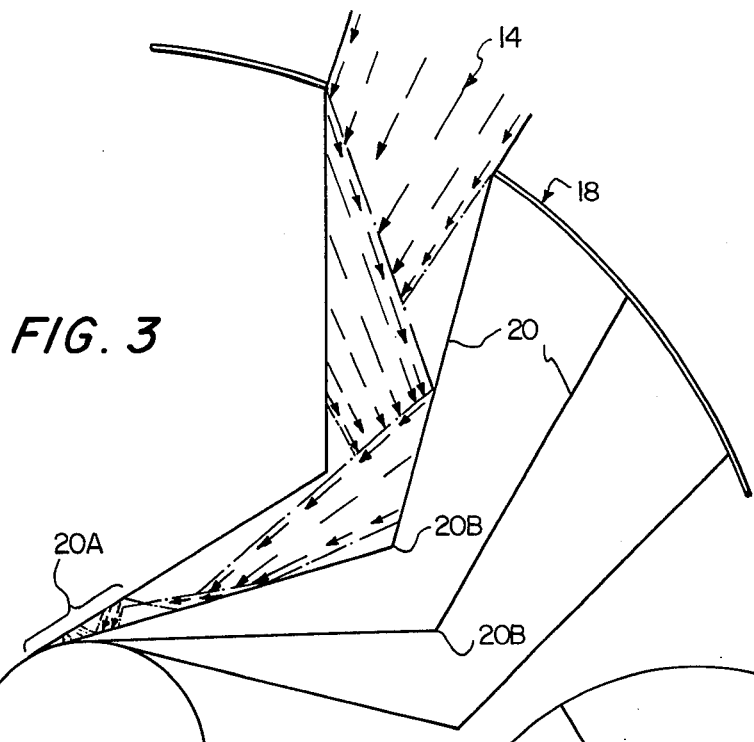
FIG. 3 is an enlarged diagrammatic view illustrating the reflections of solar radiation between the reflective fins of one embodiment of the solar fluid heater of the present invention.

The reflective rays 14, as stated hereinbefore, are focused substantially on a line longitudinally of pipes 16, 18. Accordingly, rays 14 enter pipes 16, 18 in radial directions thereof and are incident upon the angular reflective fins 20. Fins 20, as will become more readily apparent hereinafter by reference to FIG. 3, are so shaped that multiple reflections of solar radiation occur between adjacent fins and the reflected radiation will be concentrated toward the center of pipe 18 at the apex of a triangle defined by each adjacent pair of fins.

Construction errors in the parabola near the rim of the order of 1½° for a 6 ft. parabola may result in an image width of approximately 4 inches. A geometrical analysis of the solar radiation trap shows that as much as 3° error in focus or a 2° error in locating the reflecting fins will cause negligible decrease in efficiency of the radiant energy absorption.

Figure 2:
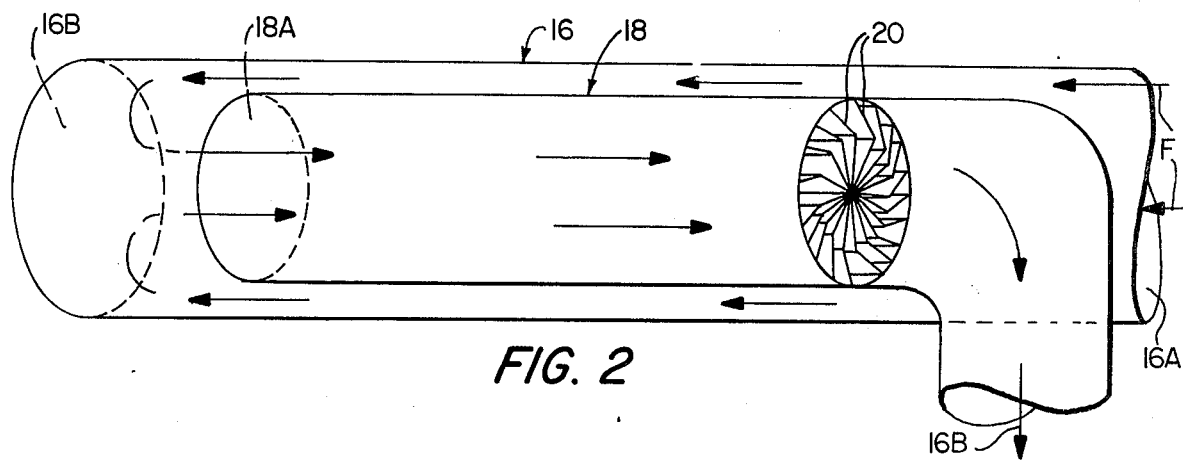
FIG. 2 is a pictorial diagrammatic view of a suitable fluid flow path through one embodiment of a solar fluid heater of the present invention.

Referring in detail to FIG. 2 there is illustrated a suitable flow pattern of the working fluid F through the solar fluid heater of the embodiment of FIG. 1. As illustrated fluid F initially passes into open end 16A of outer pipe 16 and through the annulus between pipes 16 and 18 wherein the fluid is warmed by heat transfer through pipe 18. Pipe 16 is closed at the opposite end 16B. Therefore, fluid F is next diverted into open end 18A of pipe 18. The fluid continues to flow over the surfaces of fins 20 in pipe 18 wherein it is heated and then exits from the fluid heater at 18B on route to a suitable utilization device.

Fluid F has a relatively low absorptivity for solar energy. A small portion of the incident solar radiation is absorbed by fluid F in the annulus between pipes 16 and 18. However, the major portion of incident solar radiation passes through the outer annulus and is captured by the radiation trap comprising reflective fins 20. Thus, the majority of the solar radiation is converted to heat within inner pipe 18 and transferred to the fluid F. The fluid F in the outer annulus helps insulate inner pipe 18 and minimize any heat loss therefrom.

Figure 4:
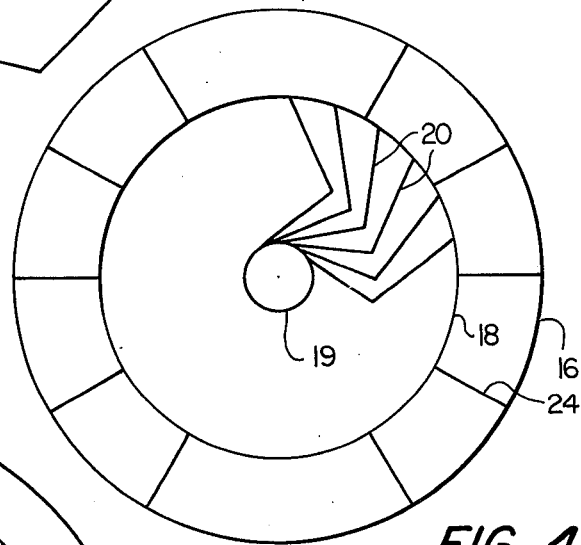
FIG. 4 is a diagrammatic end view of another embodiment of the solar fluid heater of the present invention.

Referring in detail to FIG. 4 there is illustrated a further embodiment of the present invention. In this embodiment radial reflective fins 24 are disposed in the annulus between pipes 16, 18. The fluid flow pattern is the same as illustrated in FIG. 2, namely, first through the annulus between pipes 16, 18 and back through the inner pipe 18. Accordingly, in this embodiment the fluid first passes over reflective fins 24 which assist in maintaining laminar flow of the fluid to be heated. Radial fins 24 help reduce free convection in this outer space and thus enhance the insulating properties of this space. Fins 24 are optional and may be eliminated if desired.

FIG. 3 is enlarged to illustrate the nature of the reflections between adjacent fins. It should be understood that the nature of the reflection pattern illustrated in FIG. 3 is substantially the same in all other embodiments of the invention. Although the location of the focus can be easily changed by varying the angle 20B of fins 20.

As illustrated in FIG. 3, the fins 20 are bent at points 20B to provide a tortuous radiation path between adjacent fins. The tortuous paths defined by adjacent fins results in multiple reflections of the solar radiation near the apex of adjacent fins 20 near the point of connection of the fins 20 to pipe 19. The areas between fins 20 in the region between bends 20B and pipe 19 are somewhat triangular in shape terminating in apex portions 20A.

The rays 14 illustrated in FIG. 3 are reflected between the reflecting fins 20 in such a manner as to concentrate the solar radiation near the apex 20A of the triangular area formed by each pair of fins where the solar radiation is absorbed by multiple reflections as well as by an absorptive coating on the fins in the apex region 20A. The reflective fins in these configurations, as well as many other possible configurations, with the absorptive section 20A forms an excellent solar radiation trap. This is evidenced by the fact that 10 reflections between the fins 20 with 60% absorptivity of the fins result in a total calculated absorption of 99.99% of the solar radiation.

The apex of the fins section may be made absorptive for solar energy in the range of 60% by treating specular aluminum fins (reflectivity approximately 82%) with potassium permanganate and yet maintaining a low emissivity in the infrared. Other materials may be used, if desired. This high absorptivity will result in much higher heat generation per unit volume near the center of the pipe and the low emissivity and small shape factor will assist in decreasing radiant heat flow back to the glass pipe. Thickness of the fins can be varied to regulate the rate of heat flow from the core toward the glass pipe by conduction. In addition, the long wavelength radiation reaching pipe 18 will be absorbed by the pipe if made of glass.

As illustrated in FIG. 3 the solar radiation is concentrated near the apexes 20A of the triangular space between the fins where multiple reflections on the absorptive surface converts the solar radiation to heat. Therefore, a major portion of the solar radiation incident on the fins 20 is absorbed near apexes 20A, converted to heat and transferred directly to the fluid in contact with the fins 20. Solar radiation absorbed by fins 20 before reaching the absorptive region 20A is also transferred directly to the fluid flowing therebetween. Thus, substantially all of the radiation entering pipe 18 is transferred either directly or indirectly to the working fluid F. In this embodiment as well as in the embodiment of FIG. 5 inner pipe 19 may be made larger so that the working fluid can first flow over the fins 20 and return in pipe 19. Pipe 19 may be fabricated from metal such as aluminum. To further enhance the solar fluid heater efficiency the annulus between pipes 16, 18 of this embodiment may be sealed such that a vacuum can be drawn therebetween. For this arrangement the two transparent pipes 16 and 18 would be the same length so they may be sealed together at the ends to form a space for a vaccum between the two transparent pipes. This modification permits the entry of a higher temperature working fluid into the finned section between pipes 18, 19 with the fluid returning via the inner pipe 19. The pipe 19 with reflective fins 20 can be constructed in short sections and loosely fitted together since leaking of the working fluid from the finned section to the inside pipe 19 would present no problem; in fact, small weep holes would be useful in maintaining the high concentration of heat near pipe 19. With careful design all the fluid might enter pipe 19 through small holes, thus continually moving the heated fluid radially toward the center of the pipe assembly. This system should alleviate or solve current problems of expansion of a metal pipe absorber inside a transparent pipe with the seal for a vacuum between the two. In this modification, both of the transparent pipes 16 and 18 would remain relatively cool since the entering fluid is designed to maintain laminar flow between the fins 20. The modification shown in FIG. 5 would be suitable for working fluid temperatures from 400° to 1000° F or higher. This modification could be easily utilized for electric power generation.

Figure 5:
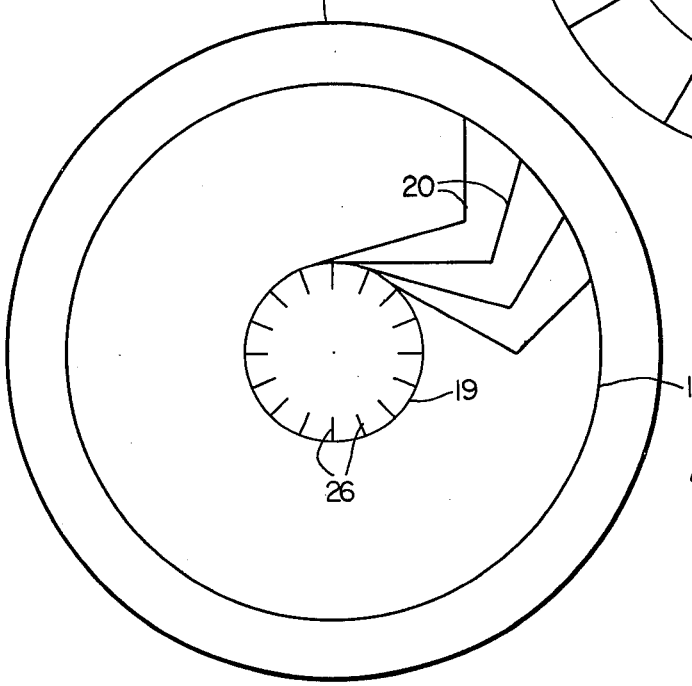
FIG. 5 is a diagrammatic end view of a further embodiment of the solar fluid heater of the present invention.
Figure 6:
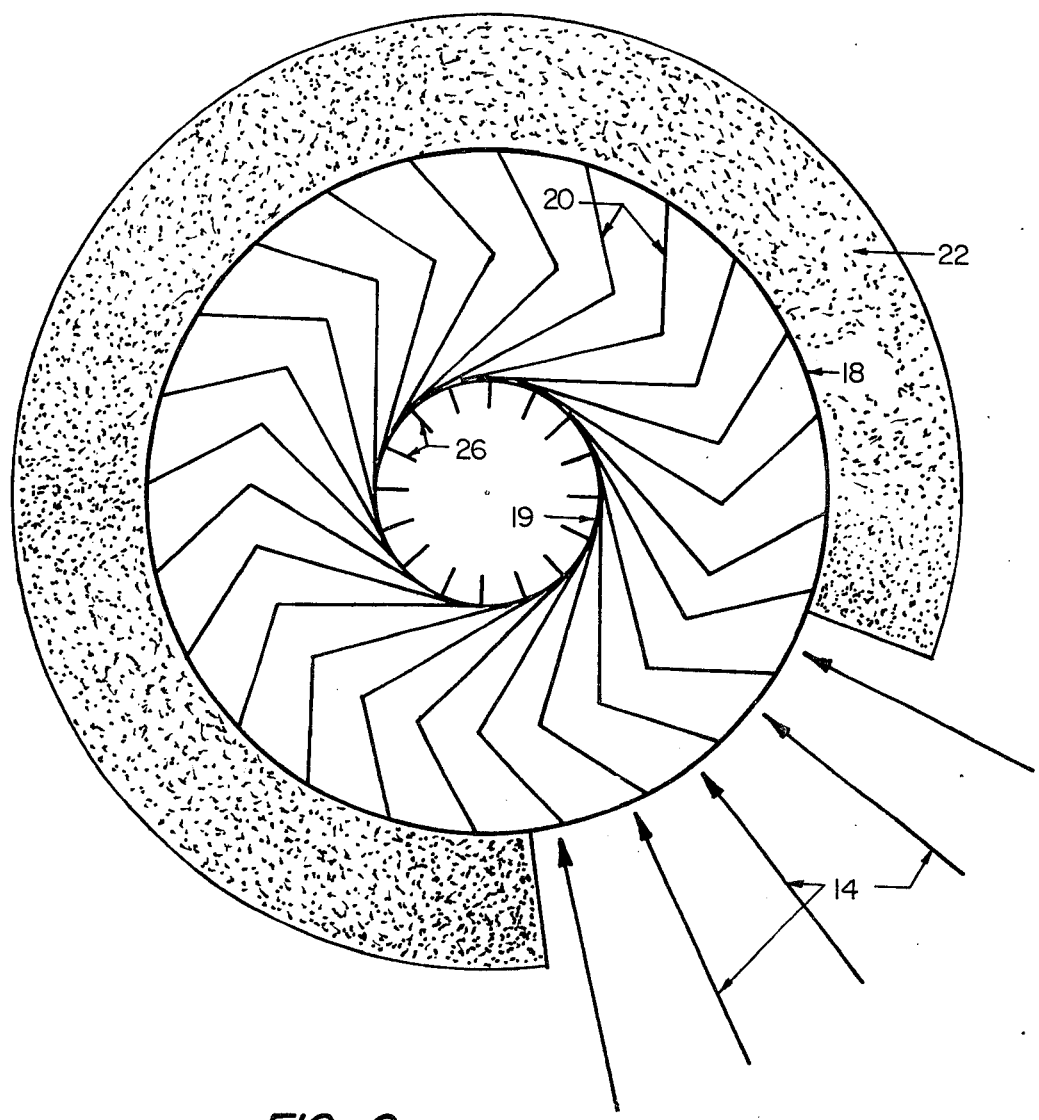
FIG. 6 is a diagrammatic end view of another embodiment of the solar fluid heater of the present invention.

As illustrated by the modification of FIG. 5 the efficiency of the solar fluid heater of the present invention may be even further enhanced. The enhanced efficiency is due to part to a plurality of convective heat transfer fins 26 within inner pipe 19. These convective fins provide additional heat transfer surfaces to the working fluid. Another embodiment of this invention, FIG. 6, utilizes insulation 22 around a major part of pipe 18 with an aperture to receive solar radiation 14 previously focused on a theoretical line, said radiation forming a small angle, generally less than 90°. In this embodiment the fluid may be caused to flow in a spiral path between the reflective fins, either by shaping the fins in a spiral in the longitudinal direction or by rotating pipe 19 with attached fins about said pipe axis within pipe 18. This embodiment is designed for use with a focussing system which reflects the solar radiation into a converging pattern in a relatively small angle, generally less than 90°. The spiral flow of the fluid rotates fluid which has been heated to the insulated side of pipe 18 thus conserving the heat energy with only with transparent pipe.

The flow pattern through the solar fluid heater of each embodiment is preferably the same as in FIG. 2. However, it should be understood that other flow patterns could be utilized without departing from the spirit and scope of the present invention.

In general the solar fluid heater of the present invention is designed so that the fluid flow between pipes 16, 18 and within pipe 18 is laminar. However, it is recognized that a certain amount of turbulence will result from the heat generated.

The working fluid for use with the present invention should have a low absorptivity for solar radiation and a high absorptivity for infrared radiation.

It should be understood that the apparatus described hereinbefore may be modified as would occur to one of ordinary skill in the art without departing from the spirit and scope of the present invention.

What is claimed is:

1. A solar fluid heater comprising:
   pipe means for conveying a working fluid to be heated, said pipe means being transparent to solar radiation;
   means for focusing solar radiation onto said pipe means; and
   radiation trap means within said pipe means for trapping and absorbing solar radiation incident on said pipe means and creating multiple internal reflections of said solar radiation within said pipe means, said radiation trap means including a plurality of spaced fins extending transversely and longitudinally of said pipe means, said fins having reflective surfaces and being so shaped as to create said multiple internal reflections of solar radiation between said fins, said reflections of solar radiation being directed toward the center of said pipe means.

2. The solar fluid heater of claim 1 wherein said pipe means comprises inner and outer concentric transparent pipes and said radiation trap means is disposed within the inner one of said concentric pipes.

3. The solar fluid heater of claim 2 wherein the outer pipe of said concentric pipes is longer than said inner pipe and has one open end and one closed end, both ends of said inner pipe being opened, and means are provided for circulating said working fluid between said pipes in a first direction and back through said inner pipe in a second direction opposite to said first direction.

4. The solar fluid heater of claim 1 wherein said pipe means includes inner and outer concentric pipes, said outer pipe being transparent to solar radiation and said radiation trap is disposed within a space between said inner and outer concentric pipes.

5. The solar fluid heater of claim 4 wherein the reflective fins of said radiation trap extend transversely between said pipes and are directly connected to said inner pipe.

6. The solar fluid heater of claim 5 wherein the portions of said reflective fins adjacent said inner pipe are coated with a solar radiation absorptive coating.

7. The solar fluid heater of claim 4 wherein there is further provided heat transfer fin means within said inner pipe.

8. The solar fluid heater of claim 4 wherein there is provided an additional transparent pipe surrounding said outer concentric pipe, said additional pipe being spaced from said outer concentric pipe.

9. The solar fluid heater of claim 8 wherein there is further provided a plurality of spaced radial fins in the space between said outer concentric pipe and said additional pipe.

10. The solar fluid heater of claim 1 wherein said means for focusing is a cylindrical parabola.

11. The solar fluid heater of claim 4 wherein the outer pipe of said concentric pipes is longer than said inner pipe and has one open end and one closed end, both ends of said inner pipe being opened, and means are provided for circulating said working fluid between said pipes in a first direction and back through said inner pipe in a second direction opposite to said first direction.

12. The solar fluid heater of claim 11 wherein a major portion of the outer pipe of said concentric pipes is insulated and the remaining portion defines an aperture through which said focused solar radiation enters said transparent pipe, said fins of said radiation trap forming a spiral in the longitudinal direction of said concentric pipes.

13. The solar fluid heater of claim 11 wherein said fins of said radiation trap are directly connected to said inner pipe and rotatable therewith with respect to said outer pipe.

14. The solar fluid heater of claim 4 wherein a major portion of the outer pipe of said concentric pipes is insulated and the remaining portion defines an aperture through which said focused solar radiation enters said transparent pipe, said fins of said radiation trap forming a spiral in the longitudinal direction of said concentric pipes.

15. The solar fluid heater of claim 4 wherein said fins of said radiation trap are directly connected to said inner pipe and rotatable therewith with respect to said outer pipe.

* * * * *